United States Patent Office 3,536,788
Patented Oct. 27, 1970

3,536,788
MODIFIED VINYL CHLORIDE RESIN COMPOSITIONS
Marvin J. Hurwitz, Elkins Park, and Harry J. Cenci, Warminster, Pa., assignors to Rohm and Haas Company, Philadelphia, Pa., a corporation of Delaware
No Drawing. Continuation-in-part of application Ser. No. 644,474, June 8, 1967. This application Apr. 22, 1968, Ser. No. 723,288
Int. Cl. C08f 29/24
U.S. Cl. 260—890  8 Claims

ABSTRACT OF THE DISCLOSURE

Rigid vinyl chloride resin compositions of high service temperature and improved toughness are provided by preparing a blend of polyvinyl chloride, a rubbery, polymeric impact modifier, and a non-rubbery copolymer modifier of a bicyclic methacrylate ester and methyl methacrylate.

---

This application is a continuation-in-part of application Ser. No. 644,474, filed June 8, 1967, now abandoned.

This invention relates to homogeneous thermoplastic vinyl chloride resin compositions possessing excellent physical properties and, more particularly, to tough, impact resistant and rigid, but processable compositions comprising an intimate mixture or blend of a vinyl chloride resin, a rubbery polymeric impact modifier and a nonrubbery, acrylic copolymer of a bicyclic methacrylate and methyl methacrylate. The bicyclic methacrylate ester contains a methacryloyl radical or group bonded to a six-membered carbon atom bridged ring and has the following Formula I:

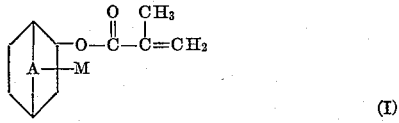

where A is —CH$_2$—, —CH(CH$_3$)—, or —C(CH$_3$)$_2$—, and M is selected from the group consisting of a hydrogen atom and a methyl group or a plurality thereof. Exemplary of such bicyclic methacrylate esters are isobornyl methacrylate, bornyl methacrylate, fenchyl methacrylate, isofenchyl methacrylate, and norbornyl methacrylate and mixtures of such bicyclic methacrylates. These esters are known compounds and may be prepared in known fashion. For example, bornyl methacrylate may be prepared from α-pinene and methacrylic acid in known manner.

Rigid vinyl chloride resinous compositions, i.e., compositions containing less than about 5 to 10% plasticzer, are characterzed by a high degree of resistance to chemical attack, by outstanding solvent resistance, by good weathering resistance. and by a high strength to weight ratio and, consequently, have come into extensive use in the chemical processing and building and construction industries. Rigid vinyl chloride resin compositions are presently finding use in such applications as, for example, chemical processing equipment, pipes and pipe fittings, moldings, sheeting, building panels, gutters, etc. The processing of rigid resinous vinyl chloride products is not, however, accomplished without serious problems and difficulty. One problem is that the extrusion or milling temperatures are extremely close to the point at which the material will degrade and the utmost care must be exercised during extrusion or milling not to exceed the degradation temperature by any significant amount. Moreover, rigid vinyl chloride resins do not achieve melt flow as readily as other thermoplastics but instead are somewhat more viscous during processing. This subjects the resins to a high shear which in turn creates additional heat, further tending to cause the material to degrade and break down.

Another problem present with rigid vinyl chloride compositions in that articles fabricated therefrom have relatively low service temperature. In practice, the practical service temperature of thermoplastic bodies is dictated by the softening temperature of the thermoplastic material, or by its heat distortion temperature, a term denoting the lowest temperature at which a material being tested, of specific dimensions, yields a specified distance under a specified loading. For example, the heat distortion temperature of polyvinyl chloride at 264 p.s.i. loading is about 75° C., a temperature which prevents the material from finding use in many applications; for example, in hot-fill food packaging applications, or in applications involving sterilization temperatures approximating that of boiling water. It is thus apparent that there is great need for an additive which will both aid the processing and heat distortion characteristics of rigid vinyl chloride resins.

Rigid vinyl chloride compositions also frequently have poor or low impact-resistant properties. The rigid vinyl chloride compositions of the present invention, however, have good impact-resistant properties over a wide range of temperatures, while at the same time showing outstanding heat distortion characteristics. This combination of toughness and improved heat distortion temperature is due to the presence of the processing and heat distortion temperature aid, namely, the non-rubbery copolymer based on a bicyclic methacrylate ester, and the rubbery-impact modifier. It is a surprising and unexpected result that the bicyclic methacrylate copolymer processing aid improves heat distortion characteristics in a rubbery modified vinyl chloride resinous system, without at the same time significantly reducing impact-resistant or toughness properties, as occurs in the case of prior art processing aids; the processing aids and the impact modifiers used in the present invention further combine to surprisingly reduce the flux time necessary to produce a homogeneous fluxed or fused composition.

The processing and heat distortion temperature aids employed in the composition of the present invention are hard, non-rubbery, thermoplastic, clear, and transparent, solid copolymers of a bicyclic methacrylate ester of Formula I, as hereinbefore defined, and methyl methacrylate. Preferably, the bicyclic methacrylate ester is isobornyl methacrylate, bornyl methacrylate or a mixture of isobornyl and bornyl methacrylates having at least 10 weight percent isobornyl methacrylate. The respective proportions or amounts of the essential and required monomers in the copolymer additive may vary as follows: 25 to 75 parts by weight for the bicyclic methacrylate, and correspondingly, 75 to 25 parts by weight for the methyl methacrylate. If desired a minor amount, up to 10% by weight, of the combined weight of the bicyclic methacrylate and the methyl methacrylate, of a C$_1$ to C$_4$ alkyl acrylate and/or up to about 10% by weight of styrene or a ring-substituted styrene, based on the combined weight of the bicyclic methacrylate and the methyl methacrylate, may be incorporated in the copolymer. Preferred alkyl acrylates are ethyl and butyl acrylate and while styrene is preferred as the other optional monomer, other alkyl-substituted or halogen-substituted styrenes may be used, such as for example, methyl styrene, dimethyl styrene, meta- and ortho-chlorostyrenes, etc. Preferably, the bicyclic methacrylate is present in the range of about 35 to 65 parts by weight for each 65 to 35 parts by weight of methyl methacrylate. The number average molecular weight of the copolymer additive as measured on a Mechrolab Membrane Osmometer Model 501 in monochlorobenzene through gel cellophane No. 600 ranges desirably from about 10,000 to 1,500,000 and above of which the range 15,000 to 1,000,000 is preferred and of which range 15,000 to 50,000 is more preferred. The intrinsic viscosity of the copolymer additive in ethylene dichloride at 30° C. on an Ostwald viscometer preferably ranges from about 0.1 to 2.0 and above (dl/gr.). When ethyl acrylate, butyl acrylate and/or styrene is present, the copolymer composition varies as follows: 25 to 75 parts by weight of bicyclic methacrylate, 75 to 25 parts by weight of methyl methacrylate, 0 to 10 parts by weight of ethyl acrylate and butyl acrylate (for each 100 parts by weight of bicyclic methacrylate and methyl methacrylate) and 0 to 10 parts by weight of styrene (for each 100 parts by weight of bicyclic methacrylate and methyl methacrylate). Preferred ranges for the optional monomers are 1 to 5 parts by weight for the alkyl acrylate such as ethyl or butyl acrylate, and 2 to 8 parts for the styrene or ring-substituted styrene.

The nonrubbery copolymer additives useful in the present invention may be made by a variety of methods. One suitable method is by bulk polymerization of the monomeric ingredients. In accordance with that process a suitable amount of monomers is mixed with an addition polymerization catalyst, such as azobisisobutyronitrile, lauroyl peroxide, acetyl peroxide, t-butyl peracetate, t-butyl hydroperoxide, etc., at a temperature sufficient to cause polymerization such as in the range of 25° to 100° C. or higher. Another suitable method for making the copolymer of the invention is by an aqueous dispersion method. In this procedure the necessary copolymerizable monomers are polymerized as an emulsion in the presence of a suitable emulsifying agent such as sodium dodecylbenzene sulfonate or sodium lauryl sulfate, and the resulting polymer is recovered by a suitable method. Commonly used molecular weight regulators such as the aliphatic mercaptans, for example, n-dodecyl mercaptan, may also be included in the polymerization mixture, if desired.

The rubbery, polymeric, impact modifiers useful in the present invention comprise a class of well-known and, generally, commercially available materials. They may be heterogeneous or homogeneous in character, show increased impact strength as their amount is increased in the blend, and provide an Izod impact strength, at room temperature, of at least 1 ft./lb./inch of notch when used in the ratio of 15 parts by weight of modifier per 100 parts by weight of vinyl chloride resin. Typically, these modifiers are based on butadiene or butadiene-styrene copolymers. Representative of such modifiers are the methyl methacrylate-butadiene-styrene rubbery interpolymers disclosed and claimed in U.S. Pats. 2,943,074 and 2,857,360 to Seymour S. Feuer. Other useful modifiers include the acrylonitrile-butadiene-styrene modifiers disclosed and claimed in U.S. Pats. 2,753,322 and 2,808,387 to Parks et al.; chlorinated polyethylene, and the all acrylic impact modifiers disclosed in U.S. Pat. 3,251,904 to L. C. Souder et al.

The vinyl chloride resins useful in this invention include homopolymers of vinyl chloride as well as copolymers thereof with minor proportions of other ethylenically unsaturated compounds. Preferably, the vinyl chloride resin employed is a homopolymer of vinyl chloride, i.e., polyvinyl chloride, since the most rigid compositions are ultimately obtainable therefrom. However, the vinyl chloride resin can also contain up to about twenty percent by weight of other ethylenically unsaturated compounds copolymerizable with vinyl chloride; conversely stated, the resin should contain at least about 80 percent by weight of vinyl chloride copolymerized therein. Other ethylenically unsaturated compounds which are suitable in this respect include, for example, vinyl alkanoate, such as vinyl acetate, vinyl propionate, and the like; vinyl ethers; vinyl halides, such as vinylidene bromide, vinylidene chloride, vinylidene fluorochloride, and the like; unsaturated hydrocarbons, such as ethylene, propylene, isobutylene and the like; allyl compounds such as allyl acetate, allyl chloride, allyl ethyl ether and the like, etc.

Thus, as employed herein, the term "vinyl chloride resin" is meant to include both polyvinyl chloride, and copolymers of vinyl chloride with other ethylenically unsaturated monomers.

The molecular weight of the vinyl chloride resins suitable for use in this invention can vary over a wide range. An indication of the molecular weight of those vinyl chloride resins particularly useful in this invention may be obtained by reference to the resin's Fikentscher K-value and those resins having a Fikenthscher K-value of about 45 and higher and preferably between 45 and 90 may be taken as conforming to the molecular weight requirement mentioned above.

The improved vinyl chloride resin compositions of the present invention contain the rubbery impact modifier and the bicyclic methacrylate copolymer additive in effective amounts; i.e., in amounts sufficient to give good impact and toughness properties and at the same time satisfactory processing and heat distortion temperature improvement. Generally, these amounts are kept to a minimum, consistent with the benefits desired. In practice, the impact modifier is used in an amount of about 10 to 100 parts per 100 parts of vinyl chloride resin, and the bicyclic methacrylate copolymer is used in an amount of about 10 to 100 parts of vinyl chloride resin, all parts being on a weight basis. Preferably, the impact modifier is used in an amount of about 20 to 80 parts per 100 parts of vinyl chloride resin, and the bicyclic methacryate copolymer is used in an amount of about 20 to 80 parts per 100 parts of vinyl chloride resin, all parts being on a weight basis.

In the vinyl chloride resin compositions of the invention there may be used in addition to the impact modifier and the bicyclic methacrylate copolymer additional materials such as extenders, fillers, dyes, pigments, and stabilizers, as well as other conventional materials.

The use herein of the descriptive term "homogeneous" refers to the composition that is intimately mixed or blended and is well dispersed so that the composition is uniform throughout. A high degree of clarity may be obtained by matching the refractive indices of the three components or by reducing the particle size of the discontinuous phase below that of the wavelength of visible light. However, since the components are not all miscible, the composition is generally hazy or even opaque.

The examples which are provided below are merely illustrative of the invention. All parts, ratios and percentages are by weight unless otherwise mentioned. The following abbreviations are used: MMA for methyl methacrylate, IBOMA for isobornyl methacrylate.

EXAMPLE 1

(a) There is charged to a suitable container a vacuum-degassed mixture of 1640 parts of methyl methacrylate, 2460 parts of isobornyl methacrylate, 1.44 parts of lauroyl peroxide, 0.70 part of acetyl peroxide, 0.62 part of t-butyl hydroperoxide, and 0.41 part of n-dodecyl mercaptan. The container is placed in a forced air oven and bulk polymerized at 66° C. for 15 hours, followed by a finish-off period for 8 hours, at increasing temperatures of from 80° C. to 130° C. The resultant slab is broken and ground into granules which are extraced with boiling hexane and dried at 60° C. to reduce the residual monomer level to less than 0.15%. The product is a 60/40 copolymer of isobornyl methacrylate/methyl methacrylate and has a Gardner-Holdt viscosity of C (10% in toluene), and an intrinsic viscosity of about 1.5 (in ethylene dischloride, dl/gr.).

(b) By adjustment of the monomer ratios and following the procedure of (a) above, there is obtained a copolymer of the following composition: 40/60 isobornyl methacrylate/methyl methacrylate with an intrinsic viscosity of 0.4 (in ethylene dichloride, dl/gr.).

(c) A mixture of 60 parts isobornyl methacrylate, 38 parts methyl methacrylate and 2 parts ethyl acrylate is polymerized in bulk, in the presence of a peroxide catalyst, for 12–16 hours at 66° C. followed by a finish-off period of 20–24 hours at 120° C. The 60/38/2 isobornyl methacrylate/methyl methacrylate/ethyl acrylate copolymer is a clear, transparent solid and has an intrinsic viscosity (in ethylene dichloride, dl/gr.) of about 0.5–0.6.

(d) By adjustment of the monomer ratios and following the procedure of (c) above, there is obtained a copolymer of the following composition: IBOMA:MMA: EA: 40/58/2. This copolymer has an intrinsic viscosity of 0.89 (in ethylene dichloride, dl/gr.).

(e) To a suitable reactor equipped with stirrer, thermometer, nitrogen sweep, inlets for monomer addition and reflux condenser, there are charged 700 parts of water and a total of 318 parts of the following monomers: isobornyl methacrylate—150 parts; methyl methacrylate—144 parts; ethyl acrylate—6 parts, and styrene—18 parts. Sodium lauryl sulfate emulsifier (0.5%) a small amount of t-butyl mercaptan, and sufficient potassium persulfate initiator to initiate polymerization are added and the mass is emulsion polymerized for a period of about 3 to 4 hours over a temperature range starting at 65° C. and ending at about 95 to 98° C. The emulsion is then cooled, isolated by coagulation or spray dried. The product is a 50/48/2/6 IBOMA/MMA/EA[1]/styrene copolymer.

EXAMPLE 2

(a) A rubbery impact modifier is prepared according to teaching of U.S. Pat. 2,943,074, more particularly by mixing 25 parts of methyl methacrylate with 75 parts (rubber solids basis) of a butadiene-styrene-copolymer latex (the ratio of the butadiene to styrene in the latex being 70 to 30). Benzoyl peroxide (0.05 part), sodium sulfoxylate formaldehyde (0.025 part), and dodecyl mercaptan (0.44 part) are added. The mixture is agitated and polymerized for 24 hours at 60° C., coagulated, washed and dried under vacuum.

(b) Part (a) is repeated except that there are used 50 parts methyl methacrylate with 50 parts (rubber sol-

[1] EA is abbreviation for ethyl acrylate.

ids basis) of a butadiene-styrene copolymer latex (70/30: butadiene/styrene).

(c) Part (a) above is repeated except that there are used 71.25 parts of methyl methacrylate and 3.75 parts acrylonitrile with 25 parts (rubber solids basis) of a butadiene-styrene copolymer latex.

In the practice of this invention, the vinyl chloride resin, the rubbery impact modifier and the nonrubbery copolymer modifier additive can be blended in any convenient manner and order. A suitable procedure, for instance, involves manually or mechanically admixing the resins and modifiers in proportions as hereinabove described in an unheated container and adding the dry-blended mixture to an equal speed or differential roll speed two roll mill maintained at a temperature of about 350° F. to 400° F. Other methods of processing are equally effective. For example, the resin mixture can be added to a hot Banbury mill for fluxing and homogenizing and then fed to a hot roll mill or calendered for a sheeting operation. Still other methods of processing will occur to those skilled in the art and can be employed satisfactorily in accordance with this invention to provide a homogeneous blend of the vinyl chloride resin, the rubbery modifier, and the nonrubbery bicyclic methacrylate copolymer additive.

MODIFIED VINYL CHLORIDE RESIN COMPOSITIONS

A series of modified vinyl chloride resin compositions are prepared by dry blending for a few minutes polyvinyl chloride (hereinafter abbreviated PVC), the rubbery impact modifier and the non-rubbery bicyclic methacrylate copolymer. In each case, the compositions are stabilized with 3 parts of barium-cadmium laurate stabilizer. After dry blending, the specimens are milled on a two-roll mill at 365° F. for 10 minutes after flux. Processing properties, Izod impact properties and heat distortion temperature (HDT) are noted below. (Izod impact determined according to ASTM D256–56; and HDT, reported in ° C., is measured in accordance with ASTM D648–56 (1961).)

TABLE I

| Specimen identification | Composition | Parts by weight |
|---|---|---|
| A (control) | Unmodified PVC | 85 |
| B | PVC | 85 |
|  | Rubbery impact modifier of Example 2(b) above | 15 |
|  |  | 100 |
| C | PVC | 51 |
|  | Rubbery impact modifier of Example 2(b) above | 15 |
|  | Bicyclic methacrylate copolymer of Example 1(a) above | 34 |
|  |  | 100 |
| D | PVC | 80 |
|  | Rubbery impact modifier of Example 2(b) above | 20 |
|  |  | 100 |
| E | PVC | 56 |
|  | Rubbery impact modifier of Example 2(b) above | 20 |
|  | Bicyclic methacrylate copolymer of Example 1(a) above | 24 |
|  |  | 100 |
| F | PVC | 75 |
|  | Rubbery impact modifier of Example 2(b) above | 25 |
|  |  | 100 |
| G | PVC | 45 |
|  | Rubbery impact modifier of Example 2(b) above | 25 |
|  | Bicyclic methacrylate copolymer of Example 1(a) above | 30 |
|  |  | 100 |
| H | PVC | 45 |
|  | Rubbery impact modifier of Example 2(b) above | 25 |
|  | Bicyclic methacrylate copolymer of Example 1(e) above | 30 |
|  |  | 100 |
| I | PVC | 56 |
|  | Rubbery impact modifier of Example 2(b) above | 20 |
|  | Conventional acrylic processing aid (MMA/EA)(90/10) copolymer | 24 |
|  |  | 100 |

TABLE II

| Specimen | HDT, °C. (264 p.s.i.) | Izod impact, ft.-bls./inch of notch (room temperature) | Vacuum forming |
| --- | --- | --- | --- |
| A | 75 | 0.5–0.7 | Poor. |
| B | 75 | 24.1 | Do. |
| C | 85 | 2 | Excellent. |
| D | 75 | 27 | Poor. |
| E | 84 | 11.2 | Excellent. |
| F | 74 | 20 | Poor. |
| G | 86 | 6.2 | Excellent. |
| H | 88 | 7.1 | Do. |
| I | 74 | | |

The excellent processing, heat distortion and impact resistant properties of the vinyl chloride resin compositions of the present invention can be observed by inspection of Table II above. It can be seen that the unmodified Ba-Cd stabilized PVC has a heat distortion temperature of only 75° C. at 264 p.s.i., very poor impact properties and poor processing and working properties as indicated by its inability to be vacuum-formed. Significant increase in HDT and in working properties is shown by specimens C, E, G, and H, without at the same time significantly sacrificing impact properties or toughness. Specimen I shows the result of using a conventional acrylic processing aid: i.e., note the decrease in HDT.

While the particular working examples above illustrate the invention wherein the bicyclic methacrylate is isobornyl methacrylate and the rubbery impact modifier is based on butadiene, styrene and methyl methacrylate, a similar improvement is noted in the processing and heat distortion characteristics, in the working properties and in the impact properties of vinyl chloride resins when the bicyclic methacrylate in the modifier is any one of those specifically mentioned in column 1 of the specification. Typical additional bicyclic methacrylate copolymer modifiers which may be used include, for example, a copolymer of 50 parts bornyl methacrylate and 50 parts methyl methacrylate; a copolymer of 40 parts methyl methacrylate and 60 parts of a mixture of 10–90 parts by weight of isobornyl methacrylate and 90–10 parts by weight of bornyl methacrylate; a copolymer of 60 parts norbornyl methacrylate and 40 parts methyl methacrylate; a copolymer of 40 parts fenchyl methacrylate and 60 parts methyl methacrylate; a copolymer of 40 parts isobornyl methacrylate, 60 parts methyl methacrylate and 3 parts butyl acrylate; a copolymer of 40 parts isobornyl methacrylate, 60 parts methyl methacrylate, 2 parts ethyl acrylate and 8 parts styrene, all parts being on a weight basis. Typical additional impact modifiers which may be used include those based on acrylonitrile, butadiene and styrene; on methyl methacrylate, acrylonitrile, butadiene and styrene; such as that of Example 2(c) above, or the all acrylic impact modifiers of U.S. Pat. 3,251,904.

The homogeneous thermoplastic vinyl chloride resin composition of this invention may be calendered to form smooth sheets or formed into conventionally sized molding powders. The composition of this invention offers many advantages over standard molding powders based on polyvinyl chloride. For example, the resistance to deformation at high temperatures under load is substantially improved over that of said molding powders. Also, standard molding powders based on polyvinyl chloride are difficult to mold into useful shapes in that the flow characteristics at injection molding temperatures and pressures are poor causing internal defects in the parts, surface defects on the parts, degradation of the molding powder due to overheating, incomplete fill of complicated parts, increased gate sizes causing substantial waste, molding difficulties, etc. On the other hand, the composition of this invention offers outstanding molding and processing characteristics. Specifically, the flow under pressure of the composition of this invention at injection molding temperatures is excellent being actually better than either the polyvinyl chloride homopolymer or the acrylic copolymer modifier containing the bicyclic methacrylate. Therefore, the composition of this invention offers improved service temperatures as well as better processing characteristics. Further, these include reduction of part defects, warping, surface blushing and improvement in mold filling and other processing characteristics.

The composition of this invention may be fabricated into pipes or pipe sections, building panels, home siding (replacing conventional sidings such as aluminum or asbestos), window components including window sash and rails, etc. by such diverse forming or molding operations as extrusion, injection molding, blow molding, rotational molding, etc. The improved resistance to deformation at elevated temperatures allows fluids at higher temperatures to be used in plastic pipe made from the composition of this invention. Further, building panels and window components made from the composition of this invention offer outstanding resistance to degradation of the appearance and the physical properties upon outdoor exposure and exposure to the various elements. Other end-use applications will readily occur to those skilled in the art.

We claim:

1. An intimately mixed vinyl chloride resin composition of improved processing characteristics, impact resistance and higher heat distortion temperature, comprising a vinyl chloride polymer selected from the group consisting of homopolymers of vinyl chloride and copolymers of vinyl chloride with minor proportions of other ethylenically unsaturated monomers, and blended therewith, a rubbery impact modifier, and an effective amount of nonrubbery copolymer of:

(a) 25 to 75 parts by weight of a bicyclic methacrylate of the formula

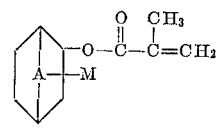

where A is selected from the group consisting of —$CH_2$—, —$CH(CH_3)$—, and —$C(CH_3)_2$—, and M is selected from the group consisting of a hydrogen atom and at least one methyl group, (b) 75 to 25 parts by weight of methyl methacrylate, (c) 0 to 10 parts by weight of a $C_1$ to $C_4$ alkyl acrylate, and (d) 0 to 10 parts by weight of styrene or a ring substituted styrene, said rubbery impact modifier present in an amount of about 10 to 100 parts per 100 parts of vinyl chloride resin, and the bicyclic methacrylate present in an amount of about 10 to 100 parts per 100 parts of vinyl chloride resin, all parts being on a weight basis.

2. The composition of claim 1 wherein the vinyl chloride resin is polyvinyl chloride.

3. The composition of claim 1 wherein the bicyclic methacrylate copolymer has a molecular weight in the range of about 10,000 to 2,000,000.

4. The composition of claim 1 in which in the bicyclic methacrylate copolymer, the bicyclic methacrylate is isobornyl methacrylate.

5. The composition of claim 1 in which the rubbery impact modifier is a butadiene-styrene copolymeric modifier.

6. The composition of claim 1 in which in the bicyclic methacrylate copolymer, (c) is ethyl acrylate or butyl acrylate and is present in an amount of 1 to 5 parts by weight.

7. The composition of claim 6 in which in the bicyclic methacrylate copolymer, (d) is styrene and is present in an amount of 2 to 8 parts by weight.

8. The method of rendering a vinyl chloride polymer more amenable to processing at heat-softening temperatures, improving the heat distortion temperature thereof and the impact-resistance properties which comprises adding and blending with said vinyl chloride polymer (1) a nonrubbery copolymer modifier of:
(a) 25 to 75 parts by weight of a bicyclic methacrylate of the formula

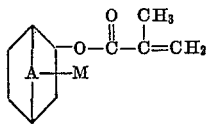

where A is selected from the group consisting of $-CH_2-$, $-CH(CH_3)-$, and $-C(CH_3)_2-$, and M is selected from the group consisting of a hydrogen atom and at least one methyl group,
(b) 75 to 25 parts by weight of methyl methacrylate,
(c) 0 to 10 parts by weight of a $C_1$ to $C_4$ alkyl acrylate, and
(d) 0 to 10 parts by weight of styrene or a ring-substituted styrene, (2) a rubbery impact modifier, each of said copolymer and rubbery impact modifier being blended in the proportion of about 10 to 100 parts by weight per 100 parts by weight vinyl chloride resin.

References Cited

UNITED STATES PATENTS

| | | | |
|---|---|---|---|
| 2,939,852 | 6/1960 | Schmidle | 260—879 |
| 2,989,420 | 6/1961 | Zdanowski | 260—879 |
| 3,005,796 | 10/1961 | Dreisbach et al. | 260—890 |

FOREIGN PATENTS 571,254   2/1959   Canada.

MURRAY TILLMAN, Primary Examiner

MICHAEL J. TULLY, Assistant Examiner

U.S. Cl. X.R.

260—80.81, 86.1, 876, 890, 897, 899